(12) United States Patent
Blasko

(10) Patent No.: US 9,361,001 B2
(45) Date of Patent: Jun. 7, 2016

(54) VISUAL CUE LOCATION INDEX SYSTEM FOR E-BOOKS AND OTHER READING MATERIALS

(71) Applicant: KONICA MINOLTA LABORATORY U.S.A., INC., San Mateo, CA (US)

(72) Inventor: Kevin Blasko, Burlingame, CA (US)

(73) Assignee: KONICA MINOLTA LABORATORY U.S.A., Inc., San Mateo, CA (US)

( * ) Notice: Subject to any disclaimer, the term of this patent is extended or adjusted under 35 U.S.C. 154(b) by 213 days.

(21) Appl. No.: 14/142,381

(22) Filed: Dec. 27, 2013

(65) Prior Publication Data

US 2015/0186353 A1     Jul. 2, 2015

(51) Int. Cl.
    *G06F 17/00*      (2006.01)
    *G06F 3/0483*      (2013.01)
    *G11B 27/34*      (2006.01)
    *G06F 17/30*      (2006.01)
    *G11B 27/034*      (2006.01)

(52) U.S. Cl.
CPC ........ *G06F 3/0483* (2013.01); *G06F 17/30017* (2013.01); *G11B 27/034* (2013.01); *G11B 27/34* (2013.01)

(58) Field of Classification Search
CPC .............................. G11B 27/034; G11B 27/34
See application file for complete search history.

(56) References Cited

U.S. PATENT DOCUMENTS

| | | | | |
|---|---|---|---|---|
| 8,793,575 | B1 * | 7/2014 | Lattyak | G09B 5/062 715/273 |
| 2005/0097135 | A1 * | 5/2005 | Epperson | H04N 21/42224 |
| 2007/0192723 | A1 * | 8/2007 | Anzelde | G06F 9/4443 715/772 |
| 2008/0256474 | A1 * | 10/2008 | Chakra | G06F 3/0481 715/772 |
| 2010/0241961 | A1 * | 9/2010 | Peterson | G06F 3/0481 715/720 |
| 2012/0078936 | A1 | 3/2012 | Kuo et al. | |
| 2013/0104072 | A1 * | 4/2013 | Havard | G06F 3/048 715/781 |
| 2013/0232409 | A1 | 9/2013 | Cranfill et al. | |
| 2014/0068428 | A1 * | 3/2014 | Puppin | G06F 17/30575 715/273 |

FOREIGN PATENT DOCUMENTS

WO      2012039864      3/2012

\* cited by examiner

*Primary Examiner* — Stephen Hong
*Assistant Examiner* — Shahid Khan
(74) *Attorney, Agent, or Firm* — Chen Yoshimura LLP

(57) ABSTRACT

Visual indicators are added to each page or screen of an e-book display to provide a visual cue to help the user associate the visual cue with content of the book and go back to previously read contents using the visual cue. The visual indicators are icon-like graphic objects placed at a desired location on the page. They have shapes that are simple, easy to remember, and easily distinguished from each other. In one example, each visual indicator has an outline shape such as a circle, triangle, square, etc. which starts out empty with no fill. As the user moves forward in the book the current visual indicator is progressively filled with a pattern. Once the visual indicator is fully filled the next visual indicator is selected and the process repeats. The visual indicators are automatically generated for each page based on the position of the page within the e-book.

20 Claims, 7 Drawing Sheets

VISUAL CUE LOCATION INDEX SYSTEM FOR E-BOOKS AND OTHER READING MATERIALS

BACKGROUND OF THE INVENTION

1. Field of the Invention

This invention relates to a method for displaying electronic documents, and in particular, it relates to a method of providing a visual indicator or cue for each displayed screen or page of an e-book or other electronic reading materials.

2. Description of Related Art

Many e-book reading devices and applications use a number, such as a page number or a percentage number, to indicate the location of the currently displayed content within the e-book or other electronic reading material. Some such devices and applications use a bar to indicate the current location. Like page numbers in physical books, these location indicators help the user know his reading progress and allow him to go to desired locations of the e-book.

SUMMARY

The present invention is directed to a method and related apparatus for generating a visual cue for an e-book display that substantially obviates one or more of the problems due to limitations and disadvantages of the related art.

An object of the present invention is to provide visual indicators or cues in e-books to aid users in recalling the location of previous content in the book and to go to specified locations of an e-book by using the visual indicators.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for displaying an electronic document on a display screen, which includes: generating a page of display on the display screen by simultaneously displaying a selected content of the electronic document and a visual indicator on the display screen, the content being associated with a position value indicating a position of the content within the electronic document, the visual indicator being a graphic object having an outline shape and an interior area enclosed by the outline shape, the interior area being filled with a filling effect, wherein the shape and the filling effect of the visual indicator are determined by the position value of the content, and wherein the visual indicator is located at a predefined location of the display screen; and repeating the generating step for a plurality of times to generate a plurality of pages of display in turn, wherein at least two of the pages of display have different visual indicators that have different outline shapes.

The filling effect may be defined by: a fill pattern which is a pattern used to fill the interior area, a degree of filling which represents a relative amount of the interior area that is filled, and a manner of filling which defines a shape of boundary lines between filled and unfilled areas.

In one example, the method further includes, prior to the generating step, storing a list of visual indicator templates, each template being defined by an outline shape, a fill pattern, and a manner of filling, each template having a template index; wherein the generating step includes: (a) receiving a user command to display selected content as a new page of display; (b) obtaining a position value P of the selected content which defines a position of the selected content in the electronic document; (c) calculating a template index I and a degree of filling F from the position value P; (d) selecting one of the pre-stored templates using the template index I calculated in step (c); (e) generate the visual indicator using the template selected in step (d) and filling the template to the degree of filling F calculated in step (c); and (f) generating the page of display using the selected content and the visual indicator generated in step (e).

In another aspect, the present invention provides a method for processing an electronic document, which includes: for each of at least some pages of the electronic document: generating a visual indicator, which is a graphic object having an outline shape and an interior area enclosed by the outline shape, the interior area being filled with a filling effect, wherein the shape and the filling effect of the visual indicator are determined by a page number of the page; and inserting the visual indicator into the electronic document at a predefined location of the page to generate a processed page; wherein at least two of the visual indicators inserted in the document have different outline shapes.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

While e-book reader devices and applications ("e-readers") provide many advantages, they also have some disadvantages compared to physical books. For example, while location indicators such as page numbers, percentage numbers or bars in e-readers can indicate reading progress, they tend to be abstract and not visually compelling. In the case of physical books, because the user needs to physically turn the book to a certain location every time he picks up the book, the user is more aware of how far he has progressed into the book. Moreover, the user can often form a mental association between particular content, such as certain topic in a thick textbook, and the physical location of that content as represented by approximately how thick a stack of pages is turned. A user of a physical book can often use this approximate association to locate contents he is searching for. A user of a physical book can also flip though the physical pages of the book to find contents by using the page thickness as a rough estimate. Conventional e-book reading devices and applications do not offer such intuitive, physical "feel" about books. Even when a page number, a percentage number or a progress bar is provided, the user is less likely to associate particular contents with such indicators because the indicators are not intuitive and not visually compelling, and as a result are easily forgotten by the user.

The descriptions below use e-books as an example, but the method can be applied to any electronic document. In this disclosure, in the context of e-books, the terms "page" and "screen of display" are used interchangeably, although these two concepts are not necessarily the same for other electronic documents.

Figure 3:
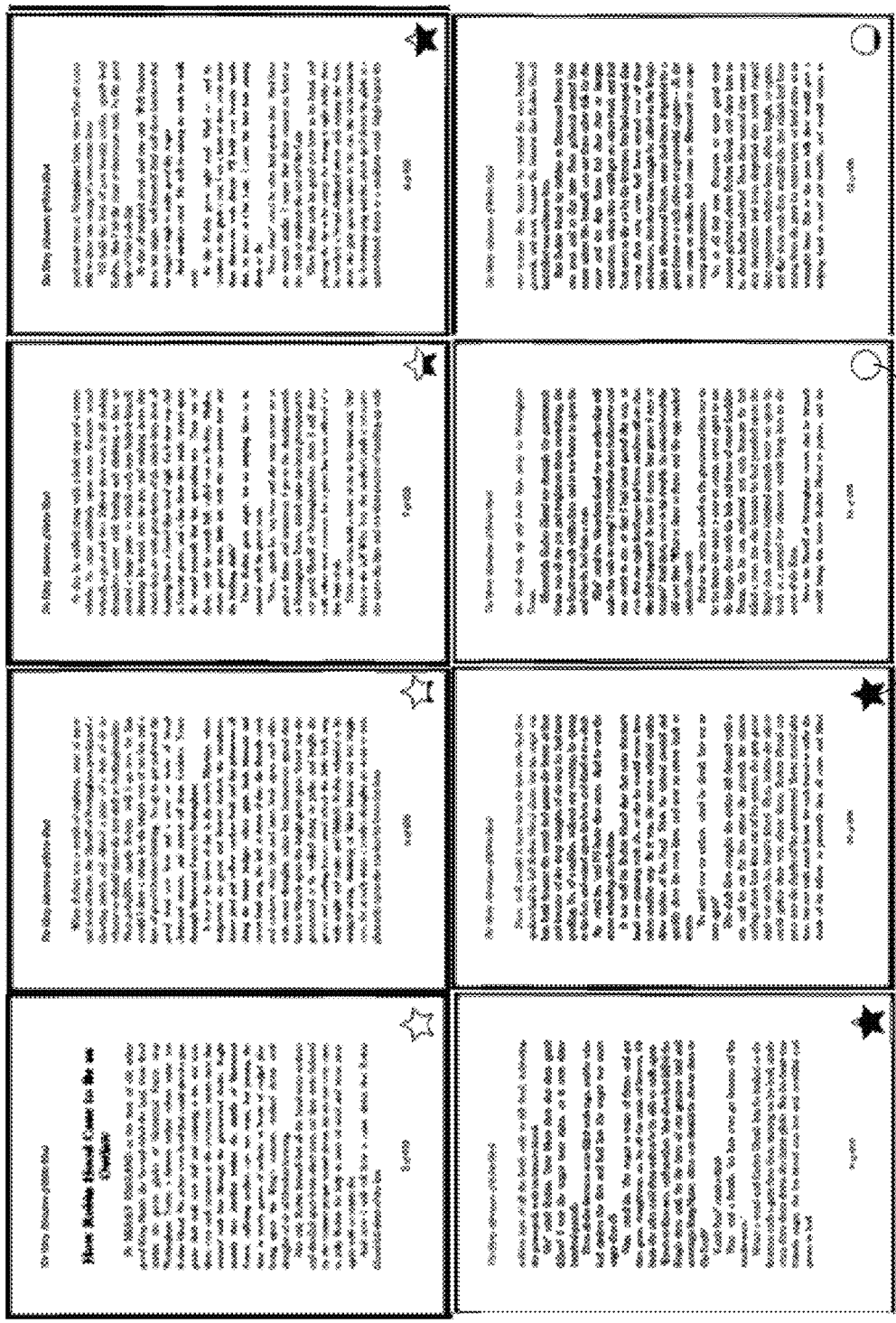
FIG. 3 illustrates multiple pages or screens of a document displayed with visual indicators according to an embodiment of the present invention.

According to embodiments of the present invention, visual indicators, which are icon-like graphic objects, are added to each page (each displayed screen) of an e-book or other electronic reading material. The visual indicators are formed of shapes that are simple, easy to remember and easily distinguished from each other. Each page bears one visual indicator, preferably at a fixed location on the page, such as in a corner or bottom center of the page, displayed simultaneously with the content of the page. An example is shown in FIG. 3, showing a sequence of pages of a document with a visual indicator 31 displayed in the lower-right corner of each page.

The preferred qualities of the visual indicators include the following: They are non-obtrusive: their sizes are comparable to typical traditional page numbers and they are located at typical locations of traditional page numbers. They show progress: for example the change in shape and fill levels of the visual indicators (described in detail later) can show progress. They are recognizable even when only passively viewed. They are easily recalled. Thus, the user can passively observe the visual indicator when reading the e-book, and form a mental association between the content of the book and the visual indicator. This can help the user more readily recall where they read certain information in the e-book, and return to the vicinity of that location by browsing a list of the visual indicators.

Throughout the e-book, multiple visual indicators are used on the different pages, and they are different from each other in their outline shapes and filling effects that fill the interior of the shape. As will be discussed in more detail later, different filling effects can be achieved by different fill patterns, different degrees of filling, and different manners of filling. In one embodiment, visual indicators on a number of consecutive pages of the e-book have the same outline shape but are filled to various degrees, e.g. filled progressively more. An example is shown in FIG. 3. In this example, star shaped indicators with increasing degrees of filling are used on the first six pages, followed by circle shaped indicators with increasing degrees of filling, etc. As exemplified in FIG. 3, visual indicators of multiple different shapes are used in a single book.

Preferably, no two pages of the e-book contain the same visual indicator (same shape and same filling effect), so that the user can uniquely associate visual indicators with contents. However, for long books, it may be necessary to use the same indicator two or more times. One approach is to use all unique visual indicators once on consecutive pages, and then start using the visual indicators again on subsequent pages. For example, if there are 100 unique visual indicators, they are used in turn once for pages 1 to 100 of the e-book, then used in turn again on pages 101 to 200, etc. Another approach is to use the same visual indicator on a predefined number of consecutive pages, and then use the next visual indicator on the next number of consecutive pages, etc. For example, if there are 100 unique visual indicators and a book has 300 pages the visual indicator would change every 3 pages. This latter approach is acceptable because contents of consecutive pages tend to be related, and repeating the same visual indicator on several consecutive pages can still help the user recall the approximate location of information. Yet another approach is to use multiple visual indicators per page. For example, if there are 26 unique shapes of visual indicators having the outline of letters 'A'-'Z' and a book has 1000 pages, the first page may have the visual indicator 'A', the second page 'B'. On the $27^{th}$ page the visual indicator may be 'AA' and on the $28^{th}$ page 'AB'. On the $703^{rd}$ page of the book the visual indicator would be 'AAA', etc.

It is noted that page numbers in e-books may not have a fixed definition, because the content displayed per screen may depend on font size and other formatting parameters. Preferably, the visual indicator displayed on each screen should be correlated to a content location parameter that is independent of font size and other formatting parameters. In other words, regardless of formatting, the same content should be associated with the same visual indicator, so that the user can correctly recall the content using the visual indicators even if the formatting has changed. Some e-readers correlate content with page numbers of the physical book (if the e-book has a corresponding physical book). Thus, for example, several display screens on the e-reader may correspond to one page of the corresponding physical book. In such a case, the same visual indicators may be used for the multiple screens of display on the e-reader that correspond to the same physical page. Some e-readers may provide internally defined locations for contents that are independent of formatting. Depending on how such content locations are defined, sometimes each screen of display may contain multiple content locations. In such a case, the visual indicators may be associated with content locations in a way that a desired number of content locations will correspond to one visual indicator. The overall result is that one or more screens of display may be assigned one visual indicator.

To create a sufficient number of visual indicators that are easily distinguishable from each other to be used for an e-book, indicators are generated to have different shapes and different filling effects. The shape is defined by an outline, and the interior area enclosed by the outline can be filled with various filling effects. Some examples are shown in FIGS. 1A-1G.

Generally, filling refers to marking a part of the interior with a fill pattern and leaving a part of it blank (e.g. white). The fill pattern may be a solid shade of gray or other color, a gradient pattern of shades of gray or other color, texture, a repetitive pattern (see various examples in FIG. 1G), etc.

Figure 1A:
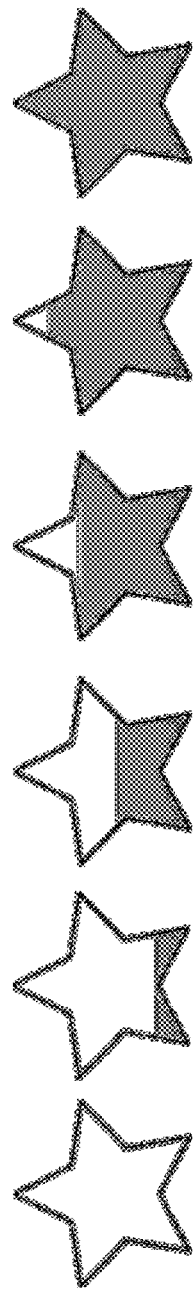
FIGS. 1A-1G illustrates exemplary visual indicators useful in embodiments of the present invention.

The interior of the indicator may be filled to various degrees, i.e., the relative sizes of the area filled with the fill pattern vs. the area left blank may vary. For example, FIG. 1A shows a five-pointed star shape filled with a gray shade to various different degrees, from no filling to partially filled to fully filled; each star can be used as a visual indicator. Likewise, each of FIGS. 1B-1F shows a shape filled to various different degrees.

Figure 1B:
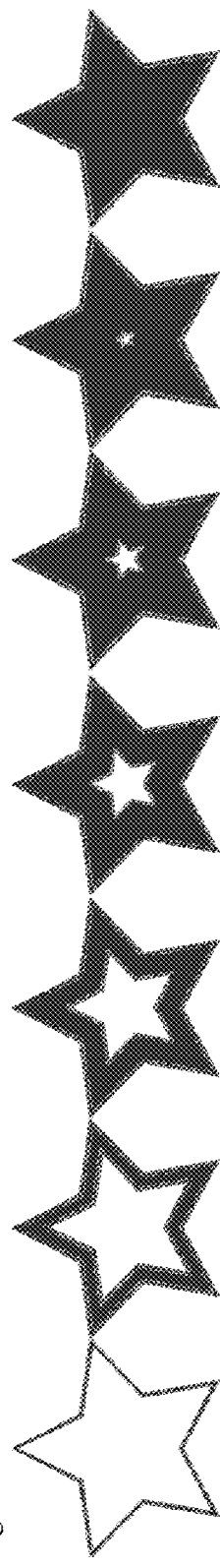
Figure 1C:
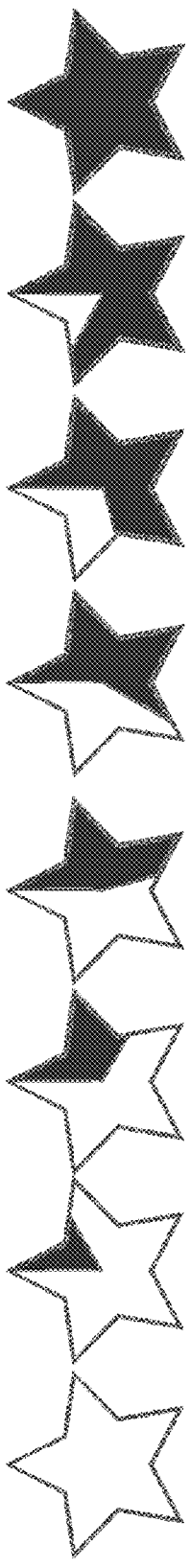
Figure 1D:
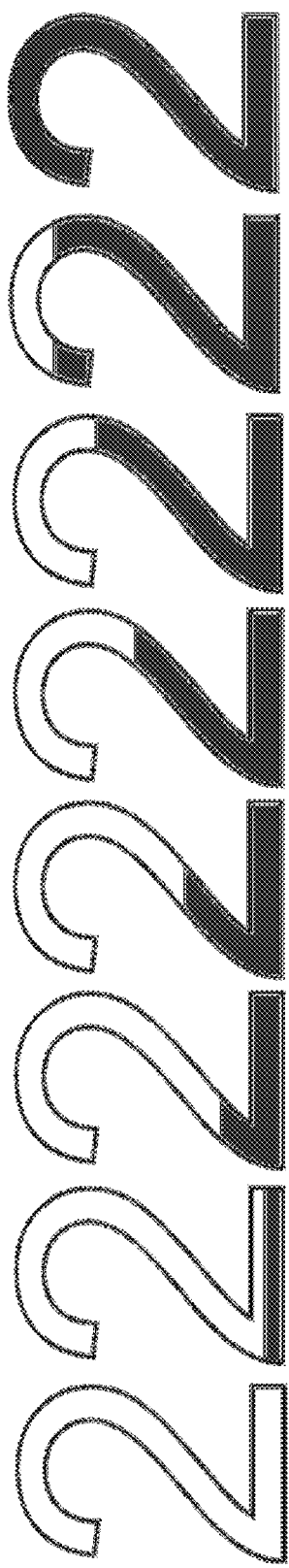
Figure 1E:
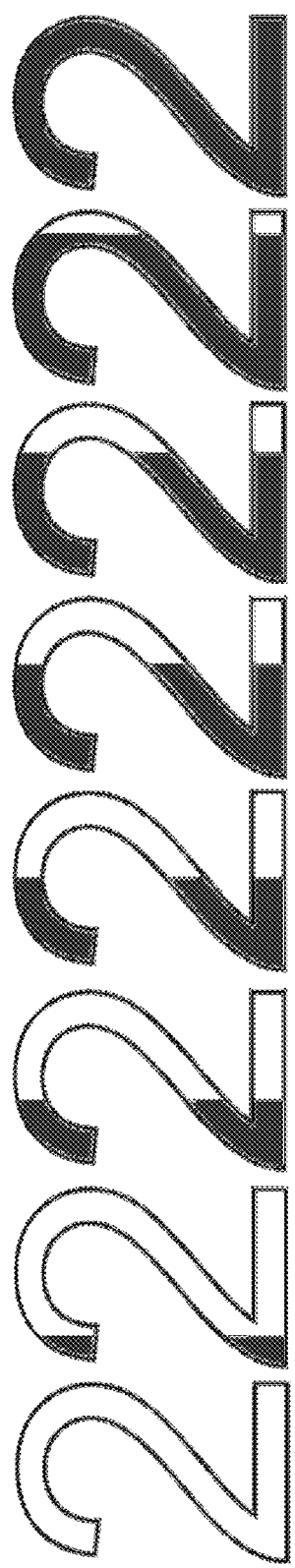
Figure 1F:
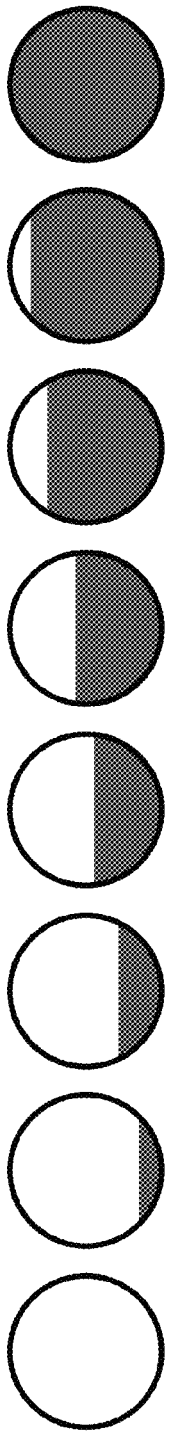
Figure 1G:
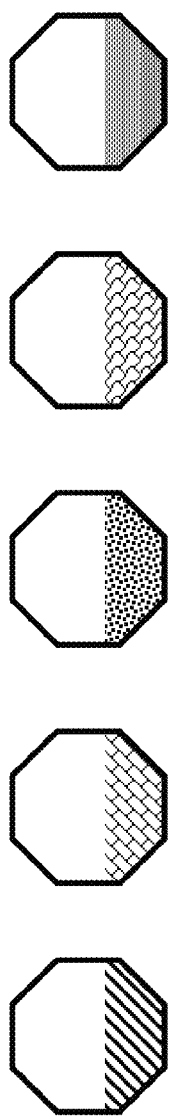

The interior of the indicators may also be filled in different manners of progression, referring to how an indicator is filled to progressively greater (or lesser) decrees, i.e., how the relative shape of the filled and unfilled areas change progressively. For example, FIG. 1A shows a five-pointed star shape filled with a gray shade in a manner that progresses in the vertical direction, where the filled and unfilled areas are delineated by a horizontal boundary that moves upward. In FIG. 1B, the manner of filling progresses in the radial direction, where the filled and unfilled areas are delineated by a boundary that parallels the outline of the five-pointed star shape and moves inward. In FIG. 1C, the manner of filling progresses in the angular direction, where a radial boundary line that delineates the filled and unfilled areas moves in a clockwise direction. FIG. 1D and FIG. 1E show examples of filling the same shape (outline of the character "2") using vertical and horizontal progressions, respectively. Another example is diagonal filling (not shown). Stated in another way, the manner of filling can be defined by the shape of the boundary line between the filled and unfilled areas. In the examples of FIG. 1A, the boundary lines are horizontal; in the examples of FIG. 1B, the boundary lines are parallel to the outline; in the examples of FIG. 1C, the boundary lines are in radial directions; in another example (not show), the boundary lines are slanted lines; etc.

Comparing FIGS. 1A-1C, and 1D-1E, it can be seen that different manners of filling can create visual indicators that have significantly different visual effects even using the same shape and fill pattern.

The shapes shown in FIGS. 1A-1G are only examples; any suitable shapes may be used for the visual indicators, such as circles, triangles, squares, other equal-sided convex polygons, stars, other polygons, outlines of alphanumeric characters, crescents, simplified shapes of physical objects such as leaves, etc. Preferably, the visual indicators have relatively compact shapes with an aspect ratio (defined as the aspect ratio of a bounding box of the shape) between 1:2 and 2:1, unlike the long bar extending across the bottom of the pages used in some conventional e-readers.

To summarize, the visual indicators are defined by their shapes and filling effects, which includes aspects such as fill patterns, degrees of filling, and manners of filling. These factors serve to visually differentiate the visual indicators from each other, allowing the user to mentally associate particular contents of the e-book with particular visual indicators.

Figure 4:
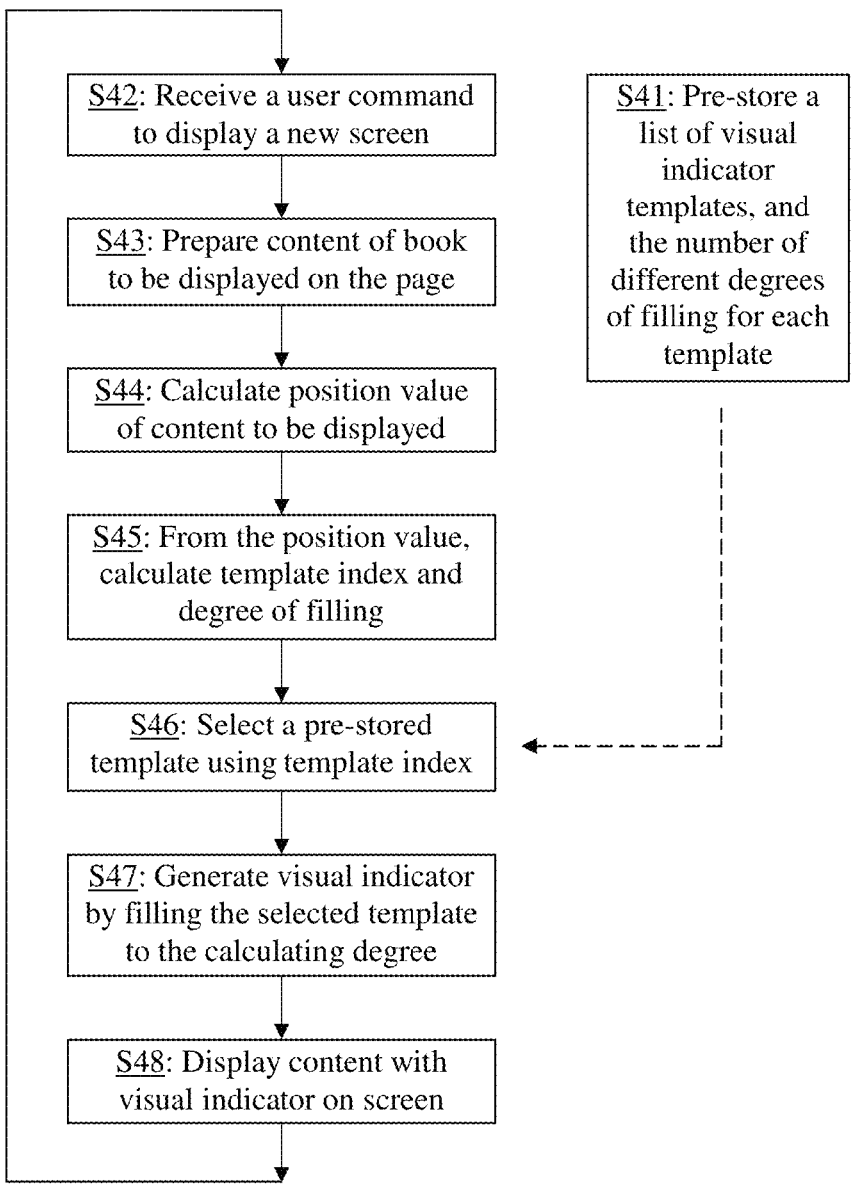
FIG. 4 schematically illustrates a process of displaying visual indicators by e-book readers according to an embodiment of the present invention.

The method for displaying the visual indicators for e-books may be implemented in a software program, and can be integrated in the control software for an e-reader device, an e-reader application on a computer, or a program used for displaying electronic documents such as PDF on a computer. FIG. 4 schematically illustrates a process of displaying pages of an e-book with visual indicators. First, a list of visual indicator templates is pre-stored in the device (e-reader or computer) (step S41). Each template is defined by a shape, a fill pattern, and a manner of filling. In other words, templates are different if they have different shapes, or different fill patterns, or different manner of filling. For example, one template may be defined by a five-pointed star shape, a solid gray fill pattern, and a radial progression manner of filling (this example would correspond to FIG. 1B). Another template may be defined by a shape that is the outline of the number "2", a solid gray fill pattern, and a horizontal progression manner of filling (this example would correspond to FIG. 1E). Each visual indicator template has an index number associated with it.

In step S42, a user command to display a new screen of content is received. The command may be a next or previous screen command, or a command to go to a specific page or location, etc. In response, the program prepares the content to be displayed on the screen (step S43), and calculates or otherwise obtains a position value P of the content to be displayed (step S44). The position value P, which represents a position of the content within the e-book, can be calculated in various ways depending on the data structure of the e-book. For example, as mentioned earlier, some e-books associate its contents with page numbers of a corresponding physical book. In such a case, the position value P can simply be a page number of the physical book that corresponds to the new screen of content. Also as mentioned earlier, some e-books have internally defined location numbers associated with contents; in such a case, the position value P can be calculated from such location numbers using a pre-defined formula. For example, the formula may define the position value P as the quotient of the location number divided by M, where M is a pre-determined number. The position value P may be rounded to the nearest integer.

Based on the position value P, a template index I for selecting a visual indicator template and a degree of filling F are calculated (step S45). In one implementation, the position value P is divided by a number N, where N is the number of different degrees of filling for each template. For example, N may be 6, meaning that it takes 6 filling steps to fill each template from no fill to fully filled (as is the case in the example shown in FIG. 1B). The integer portion of the quotient P/N is used as the template index I, and the fractional portion of the quotient P/N is used as the degree of filling F. For example, if the position value P is 22 and N is 6, the quotient P/N is 3.67; thus, I=3 and template #3 will be selected (note that under this definition the stored templates should start from index value #0), and the template will be filled to F=67% full.

A template is selected from the pre-stored list of templates using the index I (step S46), and a visual indicator is generated by filling the template to the calculated degree F. using the fill pattern and manner of filling for that template (step S47). Finally, the content prepared in step S43 and the visual indicator generated in step S47 are displayed together on the screen, with the visual indicator located at a predefined location of the screen (step S48). The process is repeated for the next user command to display a new screen.

The number of unique visual indicators needed for an e-book depends on the length of the e-book. In the above calculations, the value of N (the number of filling steps to completely fill each visual indicator template) determines how many unique visual indicators can be generated from each template. As a practical matter, if the number N is too large, the various fill degrees may become visually hard to distinguish. Also, the value of M (how internal locations are converted to position value P) will influence how many screens of content will carry the same visual indicator. Thus, the choices of the values N and M are to some degree a matter of preference. In some embodiments, the value of M and N may be automatically adjusted based on the length of the e-book.

Another way of determining which visual indicator to use on each screen is to associate the shapes of the visual indicators to natural segments of the e-book such as chapters or sections. For example, each chapter may use one shape (e.g. a star, a square, etc.), with different filling effects (including different fill patterns, manners of filling and/or degree of filling applied to the shape as desired) to generate multiple unique visual indicators for the screens within the chapter. Different chapters/sections will use different shapes of visual indicators. In such a case, outlines of letters and numbers may be used as the shapes such that the letter or number corresponds to the chapters or sections of the book. For example, the visual indicators shown in FIGS. 1D and 1E may be used for chapter 2 of a book. For this approach, step S45 of FIG. 4 can be implemented as follows: the template index I will be the chapter or section number; the degree of filling will be calculated from the position of the content within the relevant chapter/section.

Yet another way of determining which visual indicator to use on each screen is to calculate a percentage of progress in the e-book. For example, the first 10% of the e-book (regardless of the number of pages or screens) uses visual indicators having a first shape (e.g. a circle) and various different filling effects, the next 10% of the e-book uses visual indicators having a second shape (e.g. a square) and various different filling effects, etc. Step S45 of FIG. 4 can be modified accordingly to implement this alternative approach.

Figure 5:
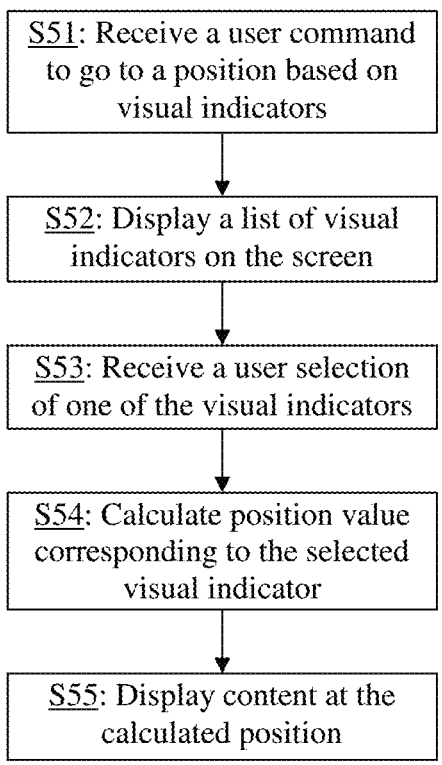
FIG. 5 schematically illustrates a process of recalling e-book content using visual indicators according to an embodiment of the present invention.

As mentioned earlier, the user may use the visual indicator to recall the location of particular contents. This process is shown in FIG. 5. The user issues a "go to" command to go to a position based on visual indicators (step S51). In response, the program displays a list of different visual indicators (step S52). The visual indicators may be displayed in a matrix so that a large number of them may be displayed on one screen. The user selects one visual indicator from the list (step S53), and the program calculates a position value P corresponding to the selected visual indicator (step S54). This calculation is the reverse of that in step S45; e.g., here, the position value P is calculated from the index value I and the degree of filling F represented by the selected visual indicator using the equation $P=(I+F)*N$. The content at the calculated position P is then displayed (step S55). This step may require converting the position value P back to a page number or internally defined location number recognized by the e-book, i.e., the reverse of step S44.

Figure 7:
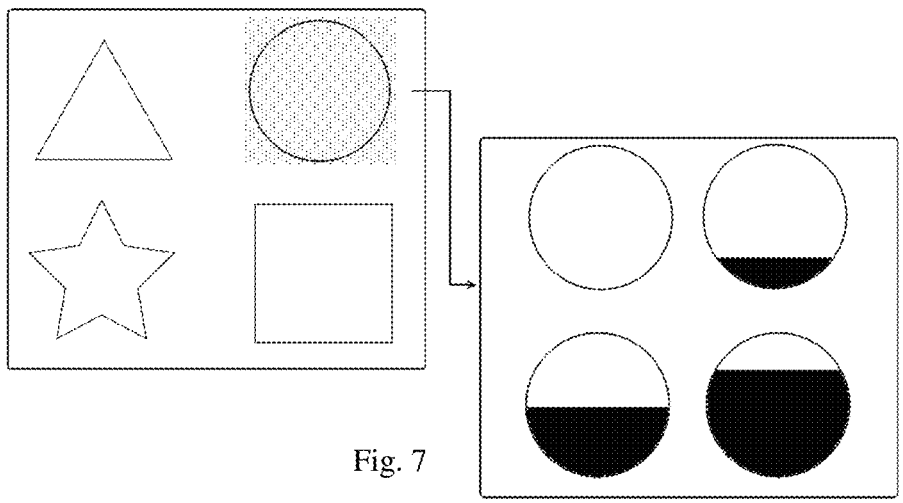

In one implementation, the list displayed in step S52 includes one partially filled visual indicator as a representative for each template. For example, while all seven visual indicators shown in FIG. 1B are used in the e-book display, only the third one from the left is included as the representative in the list of visual indicators in step S52. This reduces the number of visual indicators to be displayed in the list so that it is more likely that the list can fit on one screen, especially for long books; at the same time, this allows the user to go to a position reasonably close to the desired position. If additional precision is required after selecting a visual indicator a new collection of visual indicators can be shown with the various levels of fill using the selected visual indicator as the base shape. For example, as shown in FIG. 7, the first view shows an empty triangle, circle, star, and square. After the user selects the circle a new screen is shown with various levels of fill for the circle such as an empty circle, a ¼ filled circle, ½ filled circle, and a ¾ filled circle. The user can select one of these partially filled visual indicators as the position he wishes to go to. In another implementation, the list displayed in step S52 includes all unique visual indicators used in the e-book, including all of the ones for the same template filled to various degrees.

Figure 6:
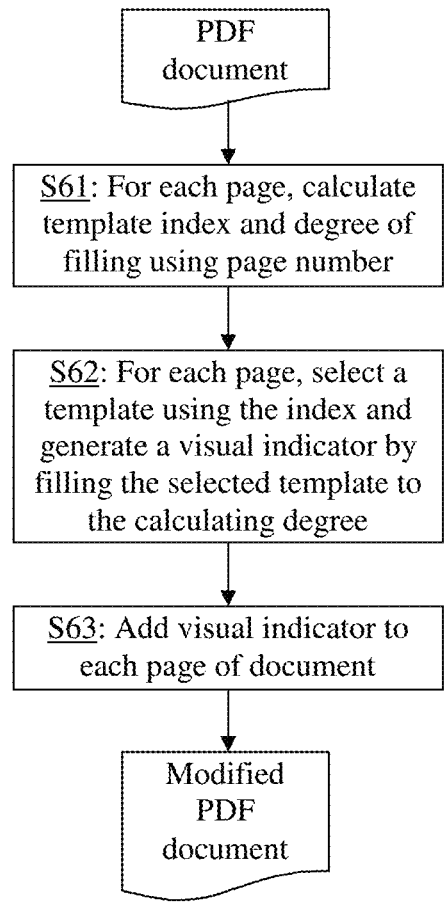
FIG. 6 schematically illustrates a process of modifying a document to add visual indicators on each page according to another embodiment of the present invention FIG. 7 schematically illustrates a visual display used to recall e-book content using visual indicators according to an embodiment of the present invention.

In another embodiment of the present invention, a PDF document, or a document of another format useful for display or printing, can be processed to add visual indicators to its pages. For such documents, pages are already defined, and one visual indicator is added to a predetermined location on each page. As shown in FIG. 6, for each page of the received document (e.g. PDF), a template index and a degree of filling are calculated using the page number (step S61). The calculation is similar to that in step S45, with the page number being used as the position value P. A template is selected using the index (similar to step S41, a list of templates having been pre-stored), and a visual indicator is generated by filling the template to the calculated degree F. using the fill pattern and manner of filling for that template (step S62). The visual indicators are added to the pages of the document at predetermined locations to generate a modified document bearing a visual indicator on each page (step S63). This may be done by inserting the visual indicators (graphic objects) into the document and specifying their locations. The modified file is stored, and then can be displayed or printed normally.

Figure 2A:
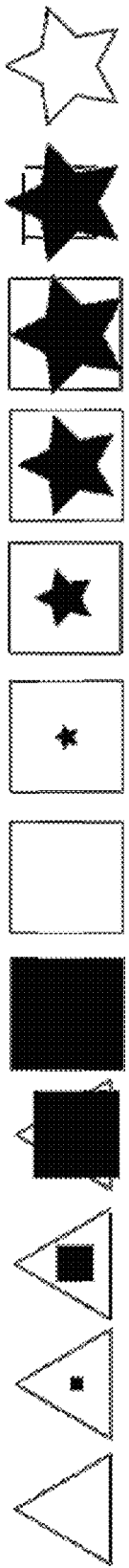
FIGS. 2A-2B illustrates additional exemplary visual indicators useful in embodiments of the present invention.
Figure 2B:
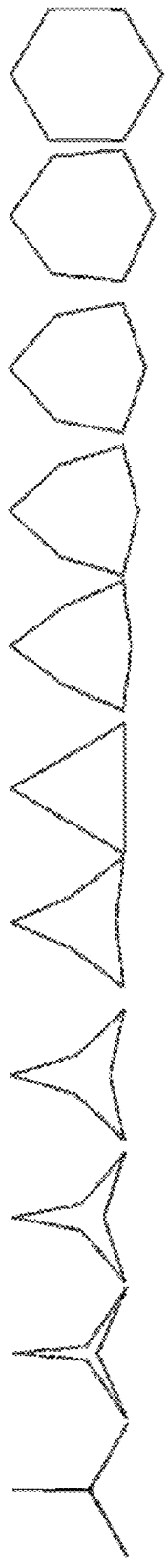

FIGS. 2A and 2B illustrate other examples of generating visual indicators. Rather than filling an outline to different degrees of filling, shape transformation is used to generate unique visual indicators. In the example shown in FIG. 2A, unique visual indicators are generated by superimposing two templates, where the size of one or both template changes progressively from one visual indicator to the next. In this example, the first five visual indicators illustrate a transformation from a triangle template to a square template, and the next seven visual indicators illustrate a transformation from a square to a five-pointed star. In this example, the second shape in the shape transformation (the square in the first five visual indicators or the star in the next seven visual indicators) is filled with a black color; it is also possible to leave them unfilled. In the examples shown in FIG. 2B, a series of unique visual indicators are generated by a transformation from an upside-down Y shape to an equilateral triangle then to a regular hexagon. The shape transformation can be computed rather than pre-stored. This type of method can be implemented similar to the method shown in FIG. 4, with the degree of filling being replaced by a degree of transformation between two templates, and filling of a template being replaced by a shape transformation.

Figure 8:
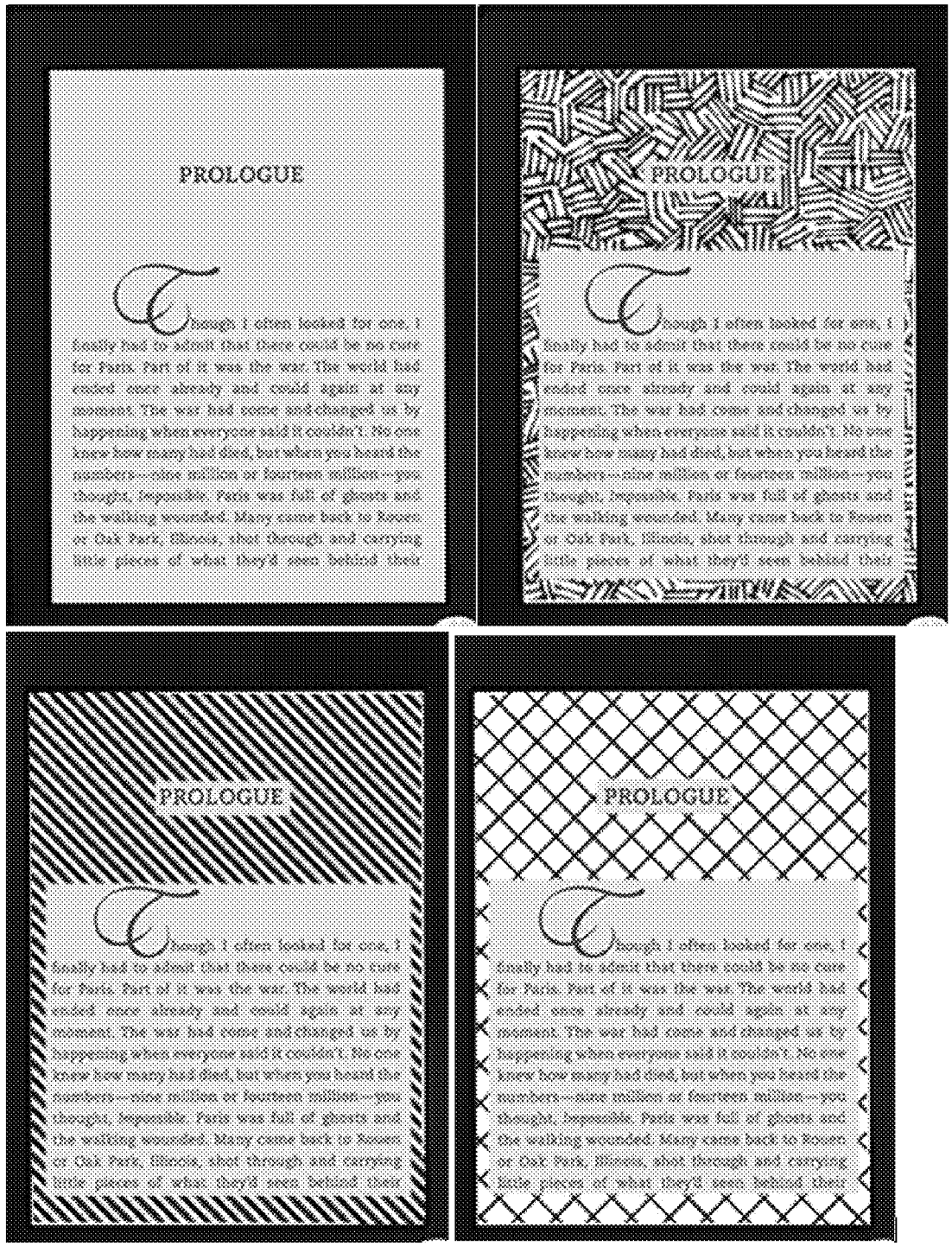
FIG. 8 illustrates an example of using background patterns as visual cues according to another embodiment of the present invention.

FIG. 8 illustrates an example of using background patterns as visual cues according to another embodiment of the present invention. Here, a pattern is provided for background areas of the screen not occupied by content. Different segments of the e-book, such as chapters, sections, etc., are provided with different background patterns while within the same segment (chapter, section, etc.) the background pattern is the same. The various background patterns should be visually recognizable as being different. Thus, the user can form a mental association between the content and the background patterns, thereby allowing the user to recall (i.e. go to) particular segments of the e-book using the background pattern as a visual cue.

Figure 9:
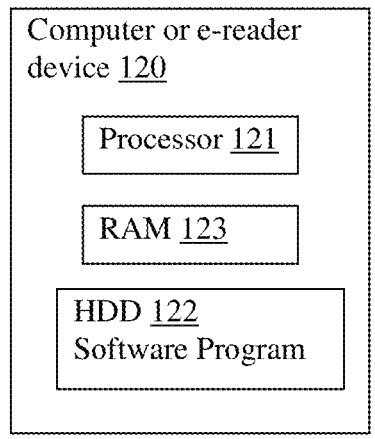
FIG. 9 schematically illustrates a data processing apparatus in which embodiments of the present invention may be implemented.

The methods described here can be implemented in a data processing system such as a computer or e-reader device 120 as shown in FIG. 9. The computer e-reader device 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

It will be apparent to those skilled in the art that various modification and variations can be made in the visual indicator display method and related apparatus of the present invention without departing from the spirit or scope of the invention. Thus, it is intended that the present invention cover modifications and variations that come within the scope of the appended claims and their equivalents.

What is claimed is:

1. A method for displaying an electronic document on a display screen, comprising:
   generating a page of display on the display screen by simultaneously displaying a selected content of the electronic document and a visual indicator on the page, the selected content being associated with a position value indicating a position of the selected content within the electronic document, the visual indicator being a graphic object having an outline shape and an interior area enclosed by the outline shape, the interior area being filled with a filling effect, wherein both the outline shape and the filling effect of the visual indicator are determined by the position value of the selected content, and wherein the visual indicator is located at a predefined location of the page; and
   repeating the generating step for a plurality of times to generate a plurality of pages of display in turn,
   wherein at least two of the generated pages of display of the electronic document have different visual indicators that have different outline shapes, the different outline shapes being determined by the position values of the selected contents of the at least two of the generated pages of display within the electronic document, and
   wherein at least another two of the generated pages of display of the electronic document have different visual indicators that have the same outline shape but different filling effects, the different filling effects being determined by the position values of the selected contents of the at least another two of the generated pages of display within the electronic document.

2. The method of claim 1, wherein the outline shapes of at least some of the visual indicators are selected from a group consisting of circles, triangles, squares, regular polygons, non-regular polygons, stars, crescents, and outlines of alphanumeric characters.

3. The method of claim 1, wherein the filling effect is defined by: a fill pattern which is a pattern used to fill the interior area, a degree of filling which represents a relative amount of the interior area that is filled, and a manner of filling which defines a shape of boundary lines between filled and unfilled areas.

4. The method of claim 3, wherein a shape of boundary lines between filled and unfilled areas is selected from a group consisting of horizontal lines, vertical lines, slanted lines, lines parallel to the outline shape, and radial line.

5. The method of claim 3, wherein the repeating of the generating step generates a set of successive pages of display with contents that have successively adjacent position values, wherein the visual indicators of the successive pages have the same outline shape, the same fill pattern, the same manner of filling, but successively different degrees of filling.

6. The method of claim 1, wherein each visual indicator has an aspect ratio, defined as an aspect ratio of a bounding box of the visual indicator, that is between 1:2 and 2:1.

7. The method of claim 1, further comprising, prior to the generating step, storing a list of visual indicator templates, each template being defined by an outline shape, a fill pattern, and a manner of filling, each template having a template index;
wherein the generating step comprises:
   (a) receiving a user command to display selected content as a new page of display;
   (b) obtaining a position value P of the selected content which defines a position of the selected content in the electronic document;
   (c) calculating a template index I and a degree of filling F from the position value P;
   (d) selecting one of the pre-stored templates using the template index I calculated in step (c);
   (e) generate the visual indicator using the template selected in step (d) and filling the template to the degree of filling F calculated in step (c); and
   (f) generating the page of display using the selected content and the visual indicator generated in step (e).

8. The method of claim 7, wherein in step (c), I is calculated as an integer portion of a value P/N where N is an integer, and F is calculated as a fractional portion of the value P/N.

9. The method of claim 7, wherein in step (c), the degree of filling F is calculated from a position of the content within a chapter or section and the template index I is the chapter or section number.

10. A computer program product comprising a computer usable non-transitory medium having a computer readable program code embedded therein for controlling a data processing apparatus, the computer readable program code configured to cause the data processing apparatus to execute a process for displaying an electronic document on a display screen, the process comprising:
   generating a page of display on the display screen by simultaneously displaying a selected content of the electronic document and a visual indicator on the page, the selected content being associated with a position value indicating a position of the selected content within the electronic document, the visual indicator being a graphic object having an outline shape and an interior area enclosed by the outline shape, the interior area being filled with a filling effect, wherein both the outline shape and the filling effect of the visual indicator are determined by the position value of the selected content, and wherein the visual indicator is located at a predefined location of the page; and
   repeating the generating step for a plurality of times to generate a plurality of pages of display of the electronic document in turn,
   wherein at least two of the generated pages of display of the electronic document have different visual indicators that have different outline shapes, the different outline shapes being determined by the position values of the selected contents of the at least two of the generated pages of display within the electronic document, and
   wherein at least another two of the generated pages of display of the electronic document have different visual indicators that have the same outline shape but different filling effects, the different filling effects being determined by the position values of the selected contents of the at least another two of the generated pages of display within the electronic document.

11. The computer program product of claim 10, wherein the outline shapes of at least some of the visual indicators are selected from a group consisting of circles, triangles, squares, regular polygons, non-regular polygons, stars, crescents, and outlines of alphanumeric characters.

12. The computer program product of claim 10, wherein the filling effect is defined by: a fill pattern which is a pattern used to fill the interior area, a degree of filling which represents a relative amount of the interior area that is filled, and a manner of filling which defines a shape of boundary lines between filled and unfilled areas.

13. The computer program product of claim 12, wherein a shape of boundary lines between filled and unfilled areas is selected from a group consisting of horizontal lines, vertical lines, slanted lines, lines parallel to the outline shape, and radial line.

14. The computer program product of claim 12, wherein the repeating of the generating step generates a set of successive pages of display with contents that have successively adjacent position values, wherein the visual indicators of the successive pages have the same outline shape, the same fill pattern, the same manner of filling, but successively different degrees of filling.

15. The computer program product of claim 10, wherein each visual indicator has an aspect ratio, defined as an aspect ratio of a bounding box of the visual indicator, that is between 1:2 and 2:1.

16. The computer program product of claim 10, wherein the process further comprises, prior to the generating step, storing a list of visual indicator templates, each template being defined by an outline shape, a fill pattern, and a manner of filling, each template having a template index;
wherein the generating step comprises:
(a) receiving a user command to display selected content as a new page of display;
(b) obtaining a position value P of the selected content which defines a position of the selected content in the electronic document;
(c) calculating a template index I and a degree of filling F from the position value P;
(d) selecting one of the pre-stored templates using the template index I calculated in step (c);
(e) generate the visual indicator using the template selected in step (d) and filling the template to the degree of filling F calculated in step (c); and
(f) generating the page of display using the selected content and the visual indicator generated in step (e).

17. The computer program product of claim 16, wherein in step (c), I is calculated as an integer portion of a value P/N where N is an integer, and F is calculated as a fractional portion of the value P/N.

18. The computer program product of claim 16, wherein in step (c), the degree of filling F is calculated from a position of the content within a chapter or section and the template index I is the chapter or section number.

19. A method for processing an electronic document, comprising:
for each page of at least some pages of the electronic document:
generating a visual indicator, which is a graphic object having an outline shape and an interior area enclosed by the outline shape, the interior area being filled with a filling effect, wherein both the outline shape and the filling effect of the visual indicator are determined by a page number of the page; and
inserting the visual indicator into the electronic document at a predefined location of the page to generate a processed page that simultaneously displays a selected content of the electronic document and the visual indicator;
wherein at least two of the visual indicators inserted into the electronic document have different outline shapes, the different outline shapes being determined by the page numbers of the pages displaying the at least two of the visual indicators, and
wherein at least another two of the visual indicators inserted into the electronic document have the same outline shapes but different filling effects, the different filling effects being determined by the page numbers of the pages displaying the at least another two of the visual indicators.

20. The method of claim 19, further comprising, prior to the generating step, storing a list of visual indicator templates, each template being defined by an outline shape, a fill pattern, and a manner of filling, each template having a template index;
wherein the generating step comprises:
(a) obtaining a page number P of the page;
(b) calculating a template index I and a degree of filling F from the page number P, wherein I is calculated as an integer portion of a value P/N where N is an integer, and F is calculated as a fractional portion of the value P/N;
(c) selecting one of the pre-stored templates using the template index I calculated in step (b); and
(d) generate the visual indicator using the template selected in step (c) and filling the template to the degree of filling F calculated in step (b).

* * * * *